Oct. 26, 1926.

S. A. NORTH 1,604,475

GAUGING OR ASSORTING MACHINE

Filed Feb. 8, 1919

WITNESS

INVENTOR
S. A. NORTH

BY
ATTORNEY

Oct. 26, 1926.

S. A. NORTH 1,604,475

GAUGING OR ASSORTING MACHINE

Filed Feb. 8, 1919  4 Sheets-Sheet 2

WITNESS
Louis J. La Forest

INVENTOR
S. A. NORTH

BY
A. A. Hicke
ATTORNEY

Oct. 26, 1926.　　　　　　　　　　　　　　　　　　　　1,604,475
S. A. NORTH
GAUGING OR ASSORTING MACHINE
Filed Feb. 8, 1919　　　　　　4 Sheets-Sheet 4

WITNESS

INVENTOR
S. A. NORTH
BY
ATTORNEY

Patented Oct. 26, 1926.

1,604,475

UNITED STATES PATENT OFFICE.

SAMUEL A. NORTH, OF BRIDGEPORT, CONNECTICUT, ASSIGNOR, BY MESNE ASSIGNMENTS, TO REMINGTON ARMS COMPANY, INC., OF NEW YORK, N. Y., A CORPORATION OF DELAWARE.

GAUGING OR ASSORTING MACHINE.

Application filed February 8, 1919. Serial No. 275,780.

The present invention relates to a gauging or assorting machine for cartridge shells or other bodies which must be very accurately dimensioned in order to perform specified functions, and is adapted to operate upon such articles when presented to it in bulk to separate and assort them according to the shape or dimensions thereof, or of a certain part thereof, and to collect together those which are of a given predetermined size or shape apart from those which differ therefrom.

The machine in which the invention is embodied in the present instance is especially intended and adapted for operating on cartridge shells the shape and dimensions of which must conform to a certain standard in order to fit the breech chambers of the guns in which they are to be used, and the machine is to be used in the manufacture of such shells for separating shells or finished cartridges which are of a size and shape to function properly from those which will not.

It is an object of this invention, therefore, to provide a gauging or assorting machine which will work to very close tolerances, i. e., be able to discriminate between articles which vary only slightly in shape or size.

To this end, it is a further object to provide a selecting or assorting mechanism which is positioned to accept or reject the cartridge or other body upon the detection of very slight differences of shape or size.

A further object is the provision of such a machine in which the cartridge or other article is forced into or against a gauge or anvil which is movable against the action of a weight or the tension of a spring, the extent of which movement will determine whether or not the selecting mechanism is to be located in accepting or rejecting position.

A further object is to provide a machine of this kind which shall be simple, inexpensive to build and operate and well adapted to perform the functions outlined above.

General description.

The machine in which my invention is embodied in the present instance comprises a "floating" gauge into which the cartridge is forced by a spring-tensioned ram having a predetermined limit of travel. If the cartridge conforms to the specified standards of size and shape, it penetrates the gauge properly and the gauge is therefore not moved and the selection or rejection mechanism is not brought into play, with the result that when on the further operation of the machine the cartridge is pushed out of the gauge, it is permitted to pass into the receptacle for accepted cartridges. If, however, the cartridge is too large or so deformed as not to enter the gauge properly, the gauge will be forced rearwardly, which movement through suitable connections will release a spring-pressed rejection pan which assumes such a position with relation to the gauge that when the cartridge is pushed out of the gauge, it will be deflected and pass into the receptacle for rejected cartridges. The cartridges to be gauged are placed in a feed chute from which they are taken, one by one, and presented for insertion into the gauge by an automatic feed device.

In the drawings which accompany and form part of this specification:

Figure 1:
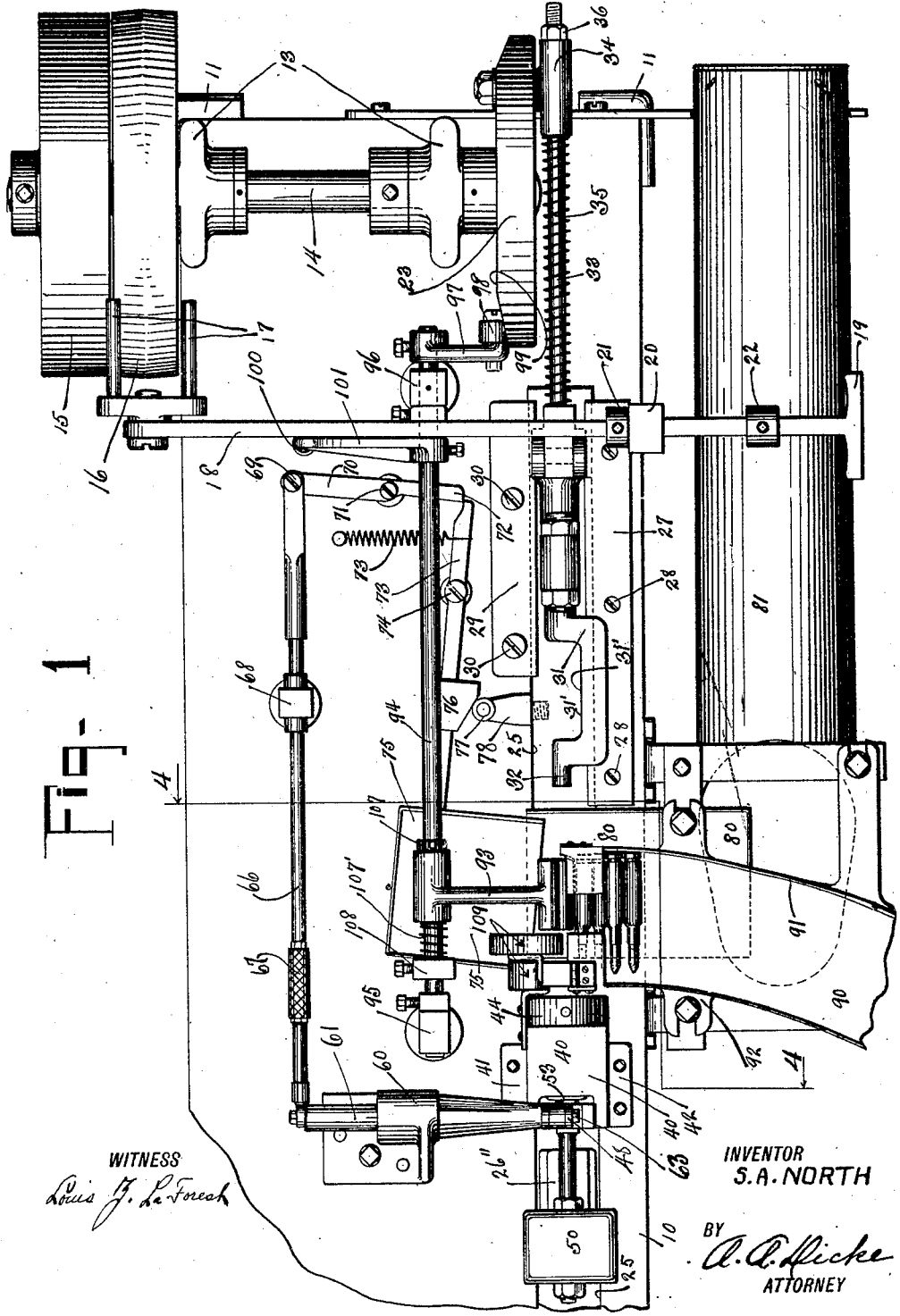
Fig. 1 is a plan view of the machine, a part of the feed chute being omitted.
Figure 3:
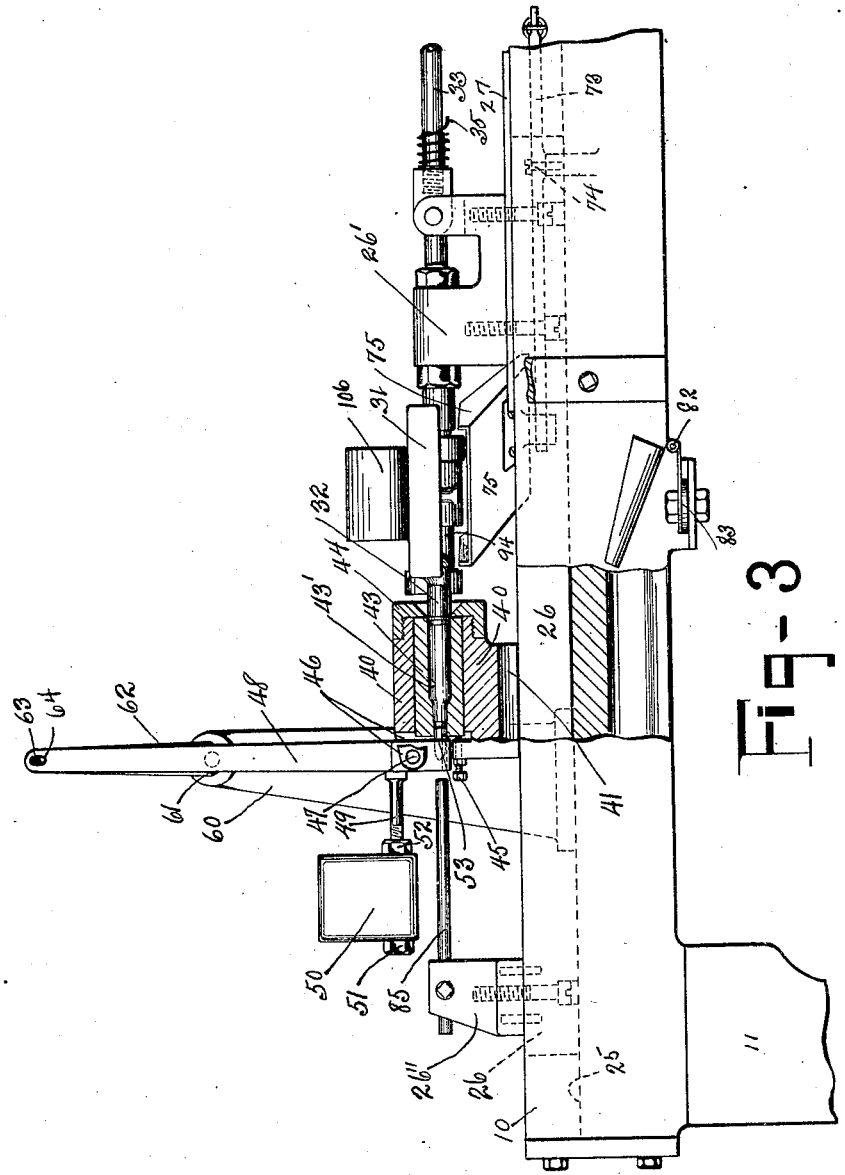
Figure 4:
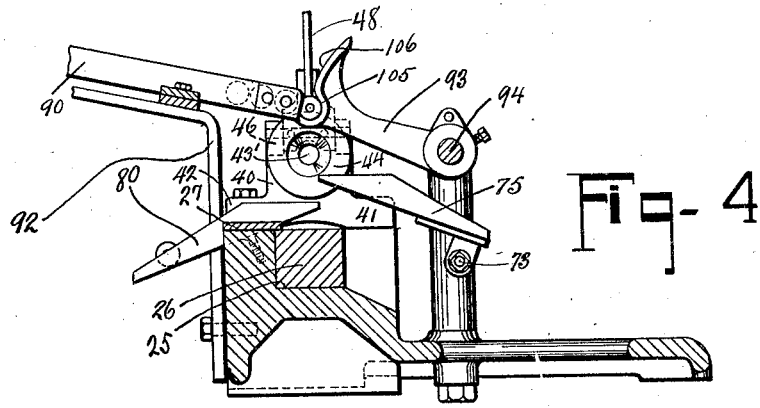
Figure 5:
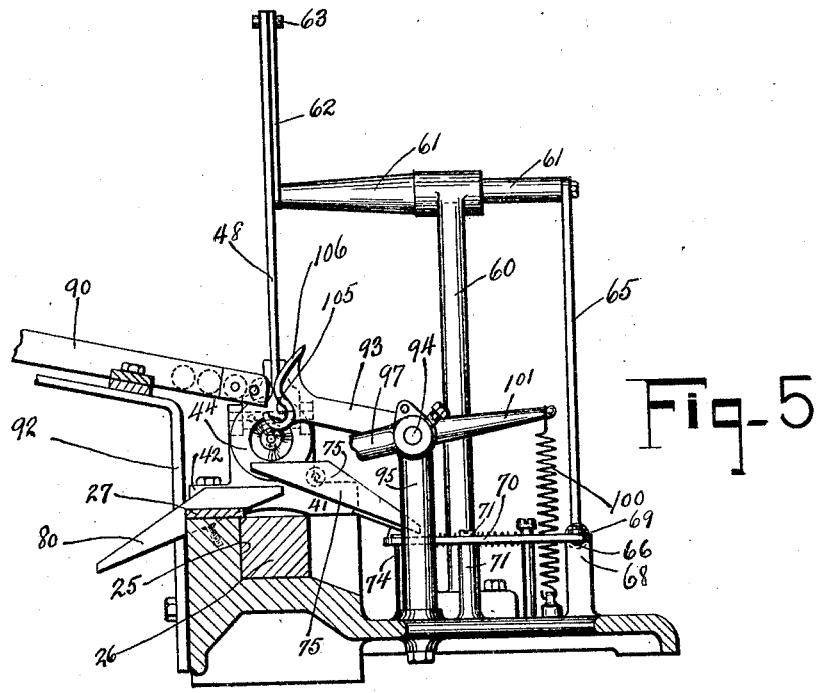

Fig. 3 is a partial side elevation showing a part of the machine after a 180 degree movement of the operating shaft, certain parts being shown in vertical section, Fig. 4 is a section taken on the line 4—4 of Fig. 1, looking in the direction of the arrows, Fig. 5 is a view similar to Fig. 4, showing the parts in position after a 180 degree movement of the main shaft, with the rejection pan in position to reject a defective cartridge.

In these figures, the numeral 10 indicates the horizontal bed plates of the machine, supported preferably by feet 11, connected, if desired, by any suitable tie-rod 12. Near one end the bed plate supports bearing standards 13 in which is supported a horizontal operating shaft 14. Supported for rotation thereon, is a loose belt pulley 15 and a tight belt pulley 16. Suitable mechanism is provided for shifting the driving belt 16′ from one to the other of these pulleys. This may comprise belt shifting fingers 17, carried by a bar 18, slidably supported in a bearing lug 20 and provided with a suitable handle 19. Adjustable collars 21 and 22 may be provided for determining the limit of motion of the bar 18.

At its other end, the shaft 14 carries a cam wheel 23 for a purpose which will appear later. The bed plate is provided with a longitudinally extending guide-way 25 in which is supported for longitudinal oscillation, the slide 26. This slide carries at one end the cross-head 26' and at the other end a knock-out punch support 26''. This slide is held in the guide-way by cover plates 27 and 29, held in place by screws 28 and 30, respectively. The cross-head carries a forwardly extending ram 31, provided with a nose 32. Pivoted to the cross-head is a connecting rod 33 slidably mounted in the knuckle 34. Upon this connecting rod is positioned a spring 35 and any suitable adjusting nut such as 36.

It will be readily seen that rotation of the shaft 14 will, through the intervening connections transmit an oscillatory movement to the cross-head and connected parts.

The gauge-housing 40 is supported on the bed-plate by means of feet 41 and 42 which straddle the reciprocating slide 26. This housing is provided with a recess, containing the gauge 43, formed with a cavity 43' suitably dimensioned and shaped in accordance with the size and form of the articles to be gauged. This gauge is held against forward movement by the closure cap 44, preferably threaded on to the housing 40. The set screw 45 or analogous means, provides an adjustable stop for limiting the rearward movement of said gauge. This stop is so adjusted as to allow a slight longitudinal movement of the gauge. The housing 40 is provided with lugs 46 between which is pivoted a lever 48 by means of a pin 47. The lever 48 carries a rearwardly extending arm 49 on which is mounted a weight 50, adjustable thereon by nuts 51 and 52. The lever 48 is provided near its lower end with knife-edge projections 53 bearing against the rear face of the gauge.

Suitably mounted upon the bed plate, is a bearing standard 60 serving as a support for a horizontal shaft 61, attached to which is an upwardly extending arm 62 provided with a pin 63, working in an elongated slot 64 in the upper end of the lever 48. The other end of the shaft 61 is provided with a downwardly extending arm 65 pivotally connected to a rod 66, slidably mounted in a bearing 68 and adjustable for length by the turn-buckle 67. The rod 66 is pivotally connected as at 69 to the horizontally disposed lever 70, pivotally mounted on the stud 71. The end 72 of the lever 70 engages with the forward end of a horizontally disposed lever 73 pivotally mounted on the stud 74 and carrying at its other end the rejection pan 75. The lever 73 is provided further with the cam lug 76, coacting at specified times with a roller or stud 77 supported by the lug 78, carried by the slide 26.

As shown best in Figs. 1, 4 and 5, I have provided a pan or chute 80 directly under the gauge for directing accepted cartridges into the delivery chute 81 which serves to carry the accepted cartridges into any suitable receptacle. The delivery chute is pivoted for vertical movement at 82 and for horizontal movement at 83 in any desired manner.

It will be seen from the parts so far described, that if a defective cartridge is presented to the gauge and forced rearward by the ram 31, that an inordinate amount of force is required to push the cartridge home. The lever 48 is therefore rocked on its pivot against the action of the weight 50, such action through the intervening connections rocking the latch lever 70, permitting the end 72 thereof to clear the lever 73, whereupon the spring 73 forces the rejection pan under the end of the gauge, as shown in Fig. 5, so that when the cartridge is later pushed out of the gauge by the knock-out punch 85, it will be deflected by the rejection pan into any suitable receptacle provided for receiving rejected cartridges.

*Feed mechanism.*

Cartridges to be gauged are manually placed in a sloping feed chute 90 provided with vertical sides 91 and supported in any suitable manner as by a bracket 92. As the work of keeping the feed chute filled requires only a small part of the operator's time, opportunity is given for visually inspecting the cartridges at this time. While in the present instance manual feeding is preferred, it is to be understood that any suitable automatic mechanism for feeding the cartridges into such a chute may be substituted if desired without departing from my invention. In order to carry the cartridges from the chute, one at a time, to a position in front of the gauge, I provided a feed arm 93 mounted for actuation upon a horizontal shaft 94, suitably mounted in bearings 95 and 96 oscillated at suitable times by a crank arm 97 carrying a stud or roller 98 bearing upon a properly shaped cam face 99 on the inner edge of the wheel 23. The stud or roller 98 is held against the cam face by means of the spring 100, acting upon an arm 101, mounted upon the shaft 94. The arm 93 has an enlarged head formed with a carrying recess 105 above which is located the cylindrical face 106. When the parts are in the position shown in Fig. 4, the first cartridge in the chute rolls into the carrying recess 105 and when the feed arm is moved downwardly, it is carried to a position opposite the gauge 43. In the meantime the cylindrical face 106 serves to hold in position the other cartridges in the chute as shown in Fig. 5. If desired, the arm 93 may be flexibly mounted upon the shaft 94 by a spring 107', located upon the shaft and held by the collar 108. This will permit the feed arm to remain stationary while the nose 32 is in the carrying recess 105 and then to spring back to normal position through the U-shaped portion 31'. If desired, suitable counting mechanism 109 may be provided for counting the number of cartridges gauged by the machine but as any well-known type of counter would suffice for this purpose, the details thereof have not been illustrated.

*Operation.*

Figure 2:
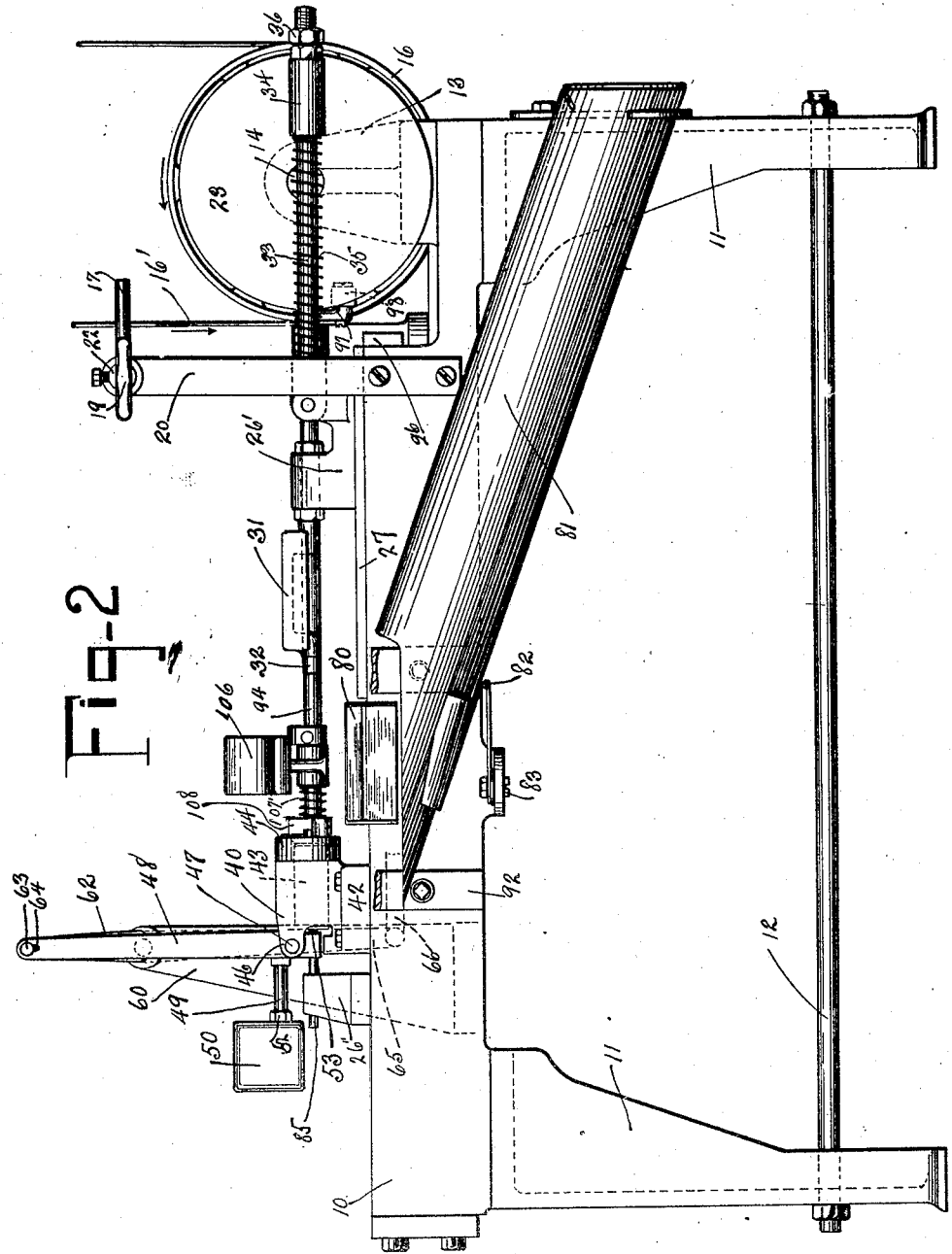
Fig. 2 is a side elevation of the entire machine.

In order to operate the machine, cartridges to be gauged are placed in the chute 90 and the belt is shifted to the pulley 16 for rotating the main shaft 14 of the machine. Assuming that the parts are initially in the position shown in Figs. 1, 2 and 4, a cartridge is located in the carrying recess 105 and upon a further movement of the operating shaft, the cam 99 will force the feed arm 93 downward into alignment with the gauge. In the meantime, the arm has moved rearwardly into engagement with the selected cartridge and now forces it into the gauge as shown in Fig. 3. While in this position, the feed arm moves upwardly, allowing the part containing the carrying recess 105 to pass through the U-shaped portion 31' of the ram 31. If the cartridge has entered the gauge without excessive resistance and the rejection mechanism has therefore not been actuated, upon the forward motion of the ram the knockout punch 85 will eject the cartridge from the gauge and permit it to be carried by the chute 80 and through the delivery chute 81 into the receptacle for accepted cartridges. If, however, the cartridge has not entered the gauge properly, the gauge will be moved rearwardly sufficiently far to rock the lever 48 on its pivot 47 and through the pin 63, arm 62, shaft 61 and arm 65 move the rod 66 and rock the lever 70 causing its end 72 to clear the lever 73, permitting the spring 73' to position the rejection pan 75 under the gauge. In this case when the cartridge is ejected from the gauge, it will be deflected by the rejection pan 75 into a suitable receptacle for defective cartridges. Near the end of the operation, the stud or roller 77 engages the cam 76 and forces the rejection pan into its original position where it is held by the end 72 of the lever 70.

While the form of mechanism here shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

Having thus described the invention, what I claim as new and desire to secure by Letters Patent is:

1. In a gauging and assorting machine, a gauge so mounted as to be movable rearwardly, and a movable ram for forcing the article to be gauged into said gauge.

2. In a gauging and assorting machine a gauge so mounted as to be movable rearwardly, a movable ram for forcing the article to be gauged into said gauge, and mechanism brought into operation upon the rearward movement of said gauge for separating articles which are of such size and shape as not to enter the gauge freely from those which will.

3. In a gauging and assorting machine, a gauge movable rearwardly against resistance, and a movable ram for forcing the article to be gauged into said gauge.

4. In a gauging and assorting machine, a gauge movable rearwardly against resistance, a movable ram for forcing the article to be gauged into said gauge, and mechanism brought into operation upon the rearward movement of said gauge for rejecting those articles which do not freely enter the gauge.

5. In a gauging and assorting machine, a movable device capable of receiving articles of a specified size and form, and means set in motion by the movement of said receiving device for separating out those articles which do not freely enter said receiving device.

6. In a gauging and assorting machine, a gauge adapted to contain articles of a specified size and form, mechanism for applying the articles to be gauged to said gauge one by one and discharging them therefrom, selecting mechanism normally held in inoperative position, and means for positioning said mechanism, in accordance with whether or not the article completely enters the gauge.

7. In a gauging and assorting machine, a gauge movable rearwardly against a predetermined resistance and a member movable for a fixed distance for bringing the articles to be gauged into contact with said gauge, selecting mechanism normally held in inoperative position and connections between said gauge and holding means for releasing said holding means upon a slight rearward movement of said gauge.

8. In a gauging and assorting machine a gauge movable rearwardly against the action of a weight, a movable member for presenting the articles to the gauge one by one, selecting mechanism normally held in inoperative position and connections between said gauge and holding means for releasing said holding means upon a slight rearward movement of said gauge.

9. In a gauging and assorting machine a gauge movable rearwardly against the action of a weight, a movable member for presenting the articles to the gauge one by one, deflecting means spring-impelled to effective position, a latch for holding it in ineffective position and connections between said gauge and latch for releasing said latch upon a slight rearward movement of said gauge.

10. In a gauging and assorting machine, a gauge adapted to contain articles of a specified size and form, mechanism for presenting articles to be gauged to said gauge one at a time, means normally holding said gauge against longitudinal movement but adapted to permit a slight longitudinal movement thereof if the article presented does not freely enter the gauge, said means comprising a pivoted lever, means associated with said lever contracting with said gauge, and a weight associated with said lever and adapted to be lifted by the movement of said gauge.

11. In a gauging and assorting machine, means for presenting articles one at a time to a gauge, a ram for forcing the articles so presented into the gauge, a gauge for receiving the articles, a weighted lever contacting with and normally preventing movement of said gauge, a selecting device, means for actuating said selecting device, means normally holding said selecting device against movement, and means associated with said weighted lever adapted to release said selecting device from said holding means when said weighted lever is moved by said gauge.

12. In a gauging and assorting machine, means for presenting articles one at a time to a gauge, a ram for forcing the article so presented into the gauge, operating means for said ram, a gauge for receiving the articles, a weighted lever contacting with and normally preventing movement of said gauge, a selecting device, means for actuating said selecting device, means normally holding said selecting device against movement, means associated with said weighted lever adapted to release said selecting device from said holding means when said weighted lever is moved by said gauge, and means associated with the ram operating means for restoring said selecting device to normal position.

13. In a gauging and assorting machine, means for presenting articles one at a time to a gauge, a ram for pushing the articles so presented into the gauge, a gauge for receiving the articles, means for removing the articles from the gauge, common operating means for said ram and said removing means, a weighted lever contacting with and normally preventing movement of said gauge, a selecting device, means for actuating said selecting device, means normally holding said selecting device against movement, means associated with said weighted lever adapted to release said selecting device from its holding means, when said weighted lever is moved by said gauge and means associated with said common operatings means for restoring said selecting device to normal position.

14. In a gauging and assorting machine, a gauge, means for presenting articles one at a time to said gauge, reciprocating means adapted when moved in one direction to insert the article presented into said gauge and when moved in the reverse direction to remove the article from the gauge, means normally retaining said gauge against longitudinal movement, but adapted to yield when the article presented does not fully enter the gauge, a selecting device, and controlling means for said selecting device actuated by said gauge retaining means.

15. In a gauging and assorting machine, a gauge, means for presenting articles one at a time to said gauge, reciprocating means adapted, when moved in one direction to insert the article presented into the gauge and when moved in the reverse direction to remove the article from the gauge, common operating means for said article presenting means and said article inserting and removing means, a selecting device, normally ineffective operating means for said selecting device, means normally preventing longitudinal movement of said gauge but adapted to yield when the article presented thereto does not fully enter said gauge, and means under the control of said gauge retaining means for rendering said selector operating means effective.

In witness whereof I have signed my name hereto this 1st day of February, 1919.

SAMUEL A. NORTH.